US012082600B2

(12) United States Patent
Metz-Dees et al.

(10) Patent No.: US 12,082,600 B2
(45) Date of Patent: Sep. 10, 2024

(54) CALCIUM CONCENTRATE SUSPENSION FOR CALCIUM FORTIFICATION OF FOOD AND DRINKS

(71) Applicant: CSM BAKERY SOLUTIONS EUROPE HOLDING B.V., Amsterdam (NL)

(72) Inventors: Mattanja Metz-Dees, Amsterdam (NL); Rob Sikking, Amsterdam (NL)

(73) Assignee: CSM BAKERY SOLUTIONS EUROPE HOLDING B.V., Amsterdam (NL)

(*) Notice: Subject to any disclaimer, the term of this patent is extended or adjusted under 35 U.S.C. 154(b) by 770 days.

(21) Appl. No.: 17/152,600

(22) Filed: Jan. 19, 2021

(65) Prior Publication Data
US 2021/0137147 A1 May 13, 2021

Related U.S. Application Data

(63) Continuation of application No. PCT/EP2019/068742, filed on Jul. 11, 2019.

(30) Foreign Application Priority Data

Jul. 19, 2018 (EP) .................................. 18184484

(51) Int. Cl.
*A23L 29/00* (2016.01)
*A23C 11/10* (2021.01)
*A23L 2/52* (2006.01)
*A23L 11/65* (2021.01)
*A23L 33/00* (2016.01)
*A23L 33/155* (2016.01)

(52) U.S. Cl.
CPC .......... *A23L 29/035* (2016.08); *A23C 11/103* (2013.01); *A23C 11/106* (2013.01); *A23L 2/52* (2013.01); *A23L 11/65* (2021.01); *A23L 33/155* (2016.08); *A23L 33/30* (2016.08)

(58) Field of Classification Search
CPC .......... A23L 2/52; A23L 33/16; A23L 29/231; A23L 33/185; A23L 33/10; A23L 33/15; A23V 2200/306; A23V 2250/50722; A23V 2250/1578
USPC ..................... 426/590, 577, 74, 59
See application file for complete search history.

(56) References Cited

U.S. PATENT DOCUMENTS

| | | | | |
|---|---|---|---|---|
| 4,851,221 A * | 7/1989 | Pak | .......................... | A61P 43/00 514/891 |
| 5,075,499 A * | 12/1991 | Walsdorf | ................ | C07C 59/08 562/590 |
| 5,780,081 A * | 7/1998 | Jacobson | ................ | A23L 33/16 426/74 |
| 5,817,351 A * | 10/1998 | DeWille | .................. | A23L 33/15 426/573 |
| 5,855,936 A * | 1/1999 | Reddy | ..................... | A23G 9/325 426/590 |
| 6,024,994 A * | 2/2000 | Jacobson | ............... | A23L 33/165 426/654 |
| 6,342,257 B1* | 1/2002 | Jacobson | ............... | A23L 33/165 426/590 |
| 6,475,539 B1* | 11/2002 | DeWille | ................ | A23L 33/115 426/573 |
| 2001/0043979 A1* | 11/2001 | Madsen | ................ | A23L 27/60 426/573 |
| 2002/0086094 A1* | 7/2002 | Buddemeyer | ........ | A23C 9/1522 426/73 |
| 2005/0271772 A1* | 12/2005 | Bailey | ....................... | A23L 2/52 426/74 |
| 2007/0065542 A1* | 3/2007 | Pak | ........................ | A61K 45/06 426/74 |
| 2007/0196539 A1* | 8/2007 | Yang | ....................... | A23L 33/16 426/74 |
| 2008/0014307 A1* | 1/2008 | Bailey | .................... | A23L 33/16 426/74 |
| 2009/0081351 A1 | 3/2009 | Mellema et al. | | |
| 2009/0142451 A1* | 6/2009 | Paikin | ....................... | A23L 2/52 426/74 |
| 2011/0135791 A1* | 6/2011 | Yang | ..................... | A23L 29/256 426/74 |
| 2013/0224279 A1* | 8/2013 | Bolanos Barrera | ..... | A23L 33/16 426/474 |

FOREIGN PATENT DOCUMENTS

| | | | | |
|---|---|---|---|---|
| EP | | 0865737 B1 * | 9/2002 | ............. A23L 33/16 |
| EP | | 3 042 566 A1 | 7/2016 | |
| WO | | WO-9956563 A2 * | 11/1999 | ............... A23L 2/38 |
| WO | | WO-0058367 A1 * | 10/2000 | ............. A23C 9/137 |
| WO | | WO-2007054274 A1 * | 5/2007 | ............... A23L 2/38 |

OTHER PUBLICATIONS https://pubchem.ncbi.nlm.nih.gov/compound/13136 (Jun. 24, 2005) (Year: 2005).*
International Search Report and Written Opinion of the International Searching Authority in PCT/EP2019/068742 mailed Jul. 31, 2019, 9 pages.

(Continued)

*Primary Examiner* — Drew E Becker
*Assistant Examiner* — Luis Eugenio Diou Berdecia
(74) *Attorney, Agent, or Firm* — Foley & Lardner LLP; Gilberto M. Villacorta

(57) ABSTRACT

A concentrated calcium citrate suspension is disclosed, comprising: (a) 2.0-9.0 wt. % of high methoxy pectin; (b) 2.5-7.0 wt. % tricalcium citrate particles; (c) dissolved citrate in a concentration of 1.8-7.0 wt. % citric acid equivalent; (d) 0.7-2.1 mol alkali metal cation per mol of dissolved citrate, with the alkali metal cation being selected from $Na^+$, $K^+$ and combinations thereof; and (e) 78-90 wt. % water. The concentrated calcium citrate suspension is shelf-stable, easy to handle and has a high content of (undissolved) calcium citrate. The concentrated calcium citrate suspension is particularly suited for use in the production of calcium-fortified soy protein based alternatives for dairy products.

9 Claims, No Drawings

(56) References Cited

OTHER PUBLICATIONS

Guillotin S.E. et al.: "Populations having different GalA blocks characteristics are present in commercial pectins which are chemically similar but have different functionalities" Carbohydrate Polymers 60 (2005), Laboratory of Food Chemistry, Dept. of Agrotechnology & Food Sciences, Wageningen Univ., Netherlands, Feb. 4, 2005,pp. 391-398.

* cited by examiner

CALCIUM CONCENTRATE SUSPENSION FOR CALCIUM FORTIFICATION OF FOOD AND DRINKS

CROSS-REFERENCE TO RELATED APPLICATIONS

This application is a continuation of International Application No. PCT/EP2019/068742, filed Jul. 11, 2019, which claims the benefit of and priority to European Application No. 18184484.6, filed Jul. 19, 2018, both of which are hereby incorporated by reference herein in their entireties.

TECHNICAL FIELD OF THE INVENTION

The present invention relates to a calcium concentrate that can suitably be used in the production of calcium fortified foods and drinks. The calcium concentrate according to the present invention is shelf stable and comprises an aqueous suspension of calcium citrate particles. The invention also provides a process of preparing such a calcium concentrate.

BACKGROUND OF THE INVENTION

Calcium is the most abundant mineral in the human body. Calcium is required for vascular contraction and vasodilation, muscle function, nerve transmission, intracellular signalling and hormonal secretion, though less than 1% of total body calcium is needed to support these critical metabolic functions. Serum calcium is very tightly regulated and does not fluctuate with changes in dietary intakes; the body uses bone tissue as a reservoir for, and source of calcium, to maintain constant concentrations of calcium in blood, muscle, and intercellular fluids.

The remaining 99% of the body's calcium supply is stored in the bones and teeth where it supports their structure and function. Bone itself undergoes continuous remodelling, with constant resorption and deposition of calcium into new bone. The balance between bone resorption and deposition changes with age. Bone formation exceeds resorption in periods of growth in children and adolescents, whereas in early and middle adulthood both processes are relatively equal. In aging adults, particularly among postmenopausal women, bone breakdown exceeds formation, resulting in bone loss that increases the risk of osteoporosis over time.

The established Recommended Dietary Allowance (RDA) for the amounts of calcium required for bone health and to maintain adequate rates of calcium retention in healthy adults are in the range of 1,000-1,300 mg per day.

Dairy products (e.g. milk, yogurt, and cheese) are rich natural sources of calcium and are a major food contributors of this nutrient. Non-dairy sources include vegetables, such as Chinese cabbage, kale, and broccoli. Spinach provides calcium, but its bioavailability is poor.

For several reasons, large groups of consumers do not wish to consume dairy products. Most of the non-dairy alternatives for these dairy products contain soy protein as an alternative for milk protein. Since neither sources of soy protein nor the other components of such non-dairy alternatives contain significant quantities of bioavailable calcium, it has become common practice to supplement these non-dairy products with calcium.

The two main forms of calcium in calcium fortified foods are calcium carbonate and calcium citrate. Other calcium forms in fortified foods include gluconate, lactate, and phosphate. Calcium citrate malate is a well-absorbed form of calcium found in some fortified juices.

Fortification of soy protein containing foods and drinks with calcium is marked by critical instability issues. Elevated calcium levels have resulted in reduced product shelf-life, and pronounced coagulation and precipitation of formulation components. Attempts to improve the stability profile of these preparations include adjustment of pH and storage conditions, and addition of carrageenans, starches and pectins.

US 2002/0086094 discloses an aqueous calcium-enriched composition comprising a source of phosphate ions, a source of citrate ions, a source of calcium ions, a quantity of metal hydroxide and water. This calcium-enriched composition can be used to supplement food products with calcium.

US 2009/0081351 describes a method of producing an edible aqueous liquid composition that has been supplemented with at least 2 mmole calcium per litre, said method comprising the successive steps of:
  providing an acidic aqueous liquid having a pH in the range of 1.0-5.0 and containing dissolved acid that is capable of forming a water-insoluble salt with calcium;
  adding to the acidic aqueous liquid a solid water-insoluble calcium carbonate salt;
  allowing the calcium carbonate to decarboxylate until all calcium is dissolved; and
  stabilising the meta-stable solution against sedimentation of calcium salt by adding soy protein to said metastable solution and, if the pH of said meta-stable solution is less than 3.2, by increasing the pH of said solution to a pH of more than 3.2.

US 2011/0135791 describes a calcium-fortified concentrate comprising:
  calcium citrate malate in an amount providing a level of solubilized calcium of at least about 0.2% by weight of the concentrate, and a level of total acids sufficient to impart a pH of about 4.2 or less to the concentrate; and
  a stabilized buffering protein component comprising protein in an amount of at least about 0.75% by weight of the concentrate; pectin in an amount of at least about 0.01% by weight of the concentrate; and propylene glycol alginate in an amount of at least about 0.03% by weight of the concentrate.

EP-A 3 042 566 describes a method for producing a vegetable fermented product comprising the steps of:
  a) fermenting a soy milk,
  b) providing a coconut cream, and
  c) mixing the coconut cream with the fermented soy milk obtained in step a) in a ratio of about 93 to 98% w/w of fermented soy milk to about 2 to 7% w/w of coconut cream.

The patent examples describe a method of preparing a yogurt like product in which fermented soy milk was mixed with coconut cream, followed by the addition of additional components, including tricalcium citrate and pectin. The patent application mentions a calcium concentration of about 120 ppm.

It is an object of the invention to provide a calcium concentrate that is shelf-stable, that has a high content of bioavailable calcium and that can suitably be used in the manufacture of calcium-fortified foods and drinks such as soy protein based alternatives for dairy products.

SUMMARY OF THE INVENTION

The inventors have developed a calcium concentrate that meets the aforementioned objectives. The calcium concentrate of the present invention is a concentrated calcium citrate suspension that comprises:

2.0-9.0 wt. % of high methoxy pectin;
2.5-7.0 wt. % tricalcium citrate particles;
dissolved citrate in a concentration of 1.8-6.5 wt. % citric acid equivalent;
0.7-2.1 mol alkali metal cation per mol of dissolved citrate, said alkali metal cation being selected from Na$^+$, K$^+$ and combinations thereof; and
78-90 wt. % water.

The inventors have designed a process that enables the preparation of the concentrated calcium suspension in a shelf-stable, easy to handle form, said process comprising:
(a) providing a buffered pectin solution comprising:
3.0-9.0 wt. % of high methoxy pectin;
citrate in a concentration of 2.0-7.0 wt. % citric acid equivalent;
0.7-2.1 mol alkali metal cation per mol of citrate, said alkali metal cation being selected from Na$^+$, K$^+$ and combinations thereof;
80-92 wt. % water;
(b) providing a calcium citrate slurry comprising 18-32 wt. % of tricalcium citrate particles and 65-82 wt. % water;
(c) mixing 100 parts by weight of the buffered pectin solution with 8 to 50 parts by weight of the calcium slurry.

This process enables the preparation of a pourable aqueous suspension having a high content of (undissolved) calcium citrate. The high methoxy pectin stabilizes the suspension and prevents sedimentation of the calcium citrate particles. The concentrated calcium citrate suspension of the present invention is particularly suited for use in the production of calcium-fortified soy protein based alternatives for dairy products.

DETAILED DESCRIPTION OF THE INVENTION

A first aspect of the present invention relates to a process of preparing a concentrated calcium citrate suspension, said process comprising the steps of:
(a) providing a buffered pectin solution comprising:
3.0-9.0 wt. % of high methoxy pectin;
citrate in a concentration of 2.0-7.0 wt. % citric acid equivalent;
0.7-2.1 mol alkali metal cation per mol of citrate, said alkali metal cation being selected from Na$^+$, K$^+$ and combinations thereof;
80-92 wt. % water;
(b) providing a calcium citrate slurry comprising 18-32 wt. % of tricalcium citrate particles and 65-82 wt. % water;
(c) mixing 100 parts by weight of the buffered pectin solution with 8 to 50 parts by weight of the calcium citrate slurry.

The term "pectin" as used herein refers to a heterogeneous group of polysaccharides comprising varying amounts of the following polysaccharide components:
(i) homogalacturonan (HG),
(ii) xylogalacturonan (XG),
(iii) apiogalacturonan (AG)
(iv) rhamnogalacturonan-I (RG-I), and
(v) rhamnogalacturonan-II (RG-II). The polysaccharide components HG, AG, XG and RG-II each comprise a backbone that consists of a linear chain of α-(1-4)-linked D-galacturonic acid units. RG-I comprises a backbone that consists of a linear chain of the repeating disaccharide units: 4)-α-D-galacturonic acid-(1,2)-α-L-rhamnose-(1. Unlike the other polysaccharide components, HG does not contain any sidechains.

The term "high methoxy pectin" as used herein refers to a pectin with a backbone that mainly consists of HG and wherein at least 50% of the galacturonic acid units are methyl esterified (degree of methyl esterification is at least 50%). The polysaccharide components HG and RG-I typically represent at least 90 wt. %, more preferably at least 95 wt. % and most preferably at least 98 wt. % of the high methoxy pectin.

The carboxyl groups of galacturonic acid residues within the backbone of the HG component may be esterified by methyl or acetyl groups, forming methyl or acetyl esters, respectively. Pectins are classified according to the degree of methyl esterification (DM). If the DM of the pectin is greater than 50%, it is classified as high methoxy (HM) pectin. If the DM is less than 50% then it is classified as low methoxy (LM) pectin. Pectin is also classified according to the degree of amidation (DA).

Yet another way to classify pectin is through the degree of blockiness (DB). The DB of a pectin is indicative of the occurrence of blocks of non methoxylated galacturonic acid residues within the backbone.

DB is the percentage expressing the total amount of non-esterified mono-, di- and tri-GalA liberated from degradation of pectin by endopolygalacturonase (an endo-polygalacturonase of *Kluyveromyces fragilis* that degrades GalA backbone only when more than 4 adjacent non-methyl-esterified GalA units are present) relative to the total amount of non-esterified GalA present in the pectin. Through DB, the pattern of methyl-esterification can be known. The parameter "absolute degree of blockiness" (DB$_{abs}$) is defined as the amount of non-esterified mono-, di- and tri-GalA liberated from degradation of pectin by endopolygalacturonase relative to the total amount of GalA present in the pectin. The calculation of DB and DB$_{abs}$ is described by Guillotin et al. (*Populations having different GalA blocks characteristics are present in commercial pectins which are chemically similar but have different functionalities,* Carbohydrate Polymers (2005) 60, 391-398) and Remoroza (Thesis titled "*Enzymatic fingerprinting and modification of acetylated pectins*", (2014) Wageningen University, the Netherlands).

The term "buffered" in relation to the pectin solution refers to the sodium citrate/citric acid buffer that is contained in the pectin solution.

Unless indicated otherwise, the generic term "citrate" as used herein encompasses both citric acid and salts of citric acid.

The term "citrate" encompasses both anhydrous and hydrated forms of citrate.

The term "citric acid equivalent" as used herein refers to the total concentration of citrate (including citric acid) in wt. %, assuming that all the citrate is present in the form of citric acid. Consequently, an aqueous solution comprising 1 wt. % trisodium citrate (anhydrous) equals 1 wt. %×(192.12/258.06)=0.74 wt. % citric acid equivalent.

The term "tricalcium citrate" as used herein is a synonym of "tricalcium dicitrate".

The term "tricalcium citrate particles" refers to tricalcium citrate that is present in non-dissolved form.

The term "soy protein" as used herein encompasses intact as well as hydrolysed soy protein. The soy protein may be denatured or undenatured. It is also within the scope of the invention to employ a blend of denatured and undenatured soy protein and/or of hydrolysed or non-hydrolysed soy.

In the present process, the buffered pectin solution is preferably prepared by dissolving the high methoxy pectin in water, followed by the addition of alkali metal citrate and citric acid, said alkali metal citrate being selected from trisodium citrate, disodium citrate, tripotassium citrate and combinations thereof. According to a particularly preferred embodiment, the buffered pectin solution is prepared by adding trisodium citrate and citric acid to the aqueous pectin solution or by first preparing a citrate buffer by adding trisodium citrate and citric acid to water, followed by addition of the citrate buffer to the pectin solution.

The high methoxy pectin is preferably dissolved in water having a temperature of 30-85° C., more preferably of 35-80° C., most preferably of 40-75° C. The water that is used in the preparation of the buffered pectin solution preferably contains less than 50 mmol/l calcium and less than 10 mmol/l magnesium.

The buffered pectin solution preferably contains less than 200 mmol/l of metal cations other than $Na^+$ and $K^+$. More preferably the buffered pectin solution contains less than 100 mmol/l, most preferably less than 75 mmol/l of metal cations other than $Na^+$ and $K^+$.

The buffered pectin solution that is employed in the present process preferably has a pH in the range of 3.0 to 5.0, more preferably in the range of 3.2 to 4.7, and most preferably in the range of 3.5 to 4.5

The pectin used in accordance with the present invention is preferably a high methoxy pectin having a degree of methyl esterification (DM) in the range of 54-90%, more preferably in the range of 58-80%, most preferably in the range of 60-75%.

The high methoxy pectin typically has a degree of amidation (DA) of 0%.

The high methoxy pectin preferably has a degree of blockiness (DB) of not more than 40%, more preferably in the range of 10-38%, most preferably in the range of 13-33%.

The absolute degree of blockiness ($DB_{abs}$) of the high methoxy pectin preferably does not exceed 15%, more preferably in the range of 2.5-13%, most preferably in the range of 3-12.

The high methoxy pectin used in accordance with the present invention is preferably a citrus pectin.

In a preferred embodiment the buffered pectin solution comprises 3.3-8.5 wt. % of high methoxy pectin, more preferably 3.5-8.2 wt. % of high methoxy pectin, most preferably 3.6-8.0 wt. % of high methoxy pectin.

The buffered pectin solution preferably comprises citrate in a concentration of 2.2-6.0 wt. % citric acid equivalent, more preferably in a concentration of 2.4-5.0 wt. % citric acid equivalent, most preferably in a concentration of 2.5-4.0 wt. % citric acid equivalent.

The water content of the buffered pectin solution preferably is in the range of 82-91 wt. %, more preferably of 84-90 wt. %.

The alkali metal cations ($Na^+$ and/or $K^+$) are preferably present in the buffered pectin solution in a concentration of 0.8-2.0 mol alkali metal cation per mol of citrate, more preferably in a concentration of 0.9-1.8 mol alkali metal cation per mol of citrate, most preferably in a concentration of 1.0-1.6 mol alkali metal cation per mol of citrate.

The combination of high methoxy pectin, citrate, $Na^+$, $K^+$ and water typically constitutes at least 80 wt. %, more preferably at least 90 wt. % of the buffered pectin solution.

In the present process, the calcium citrate slurry is preferably prepared by mixing tricalcium citrate powder with water.

The tricalcium citrate powder that is employed in the present process preferably contains at least 80 wt. % tricalcium citrate particles having a particle size of less than 500 µm, more preferably of less than 300 µm and most preferably of 5-180 µm. The particle size distribution of the tricalcium citrate powder can be determined by means of a set of sieves of different mesh sizes.

Preferably, the tricalcium citrate powder contains at least 80 wt. % of tricalcium citrate selected from anhydrous tricalcium citrate, tricalcium citrate tetrahydrate and combinations thereof. More preferably, the powder contains at least 80 wt. %, most preferably at least 90 wt. % of tricalcium citrate tetrahydrate.

Preferably, the tricalcium citrate powder employed in the preparation of the calcium citrate slurry is amorphous.

The calcium citrate slurry typically contains at least 20 wt. % of calcium citrate particles, more preferably 23-32 wt. % of calcium citrate particles, most preferably at least 25-30 wt. % calcium citrate particles.

Typically, the slurry contains not more than 1 wt. % of calcium citrate particles having a diameter in excess of 500 µm, more preferably having a diameter in excess of 400 µm. The particle size of the calcium citrate particles can be determined by means of laser diffraction.

The water content of the calcium citrate slurry preferably is in the range of 67-77 wt. %, more preferably in the range of 69-75 wt. %.

The combination of tricalcium citrate particles and water typically constitutes at least 80 wt. %, more preferably at least 90 wt. % of the calcium citrate slurry.

In a preferred embodiment 100 parts by weight of the buffered pectin solution are mixed with 12 to 42 parts by weight of the calcium citrate slurry, more preferably with 15 to 36 parts by weight of the calcium citrate slurry, most preferably with 20 to 34 parts by weight of the calcium citrate slurry.

In the present process the buffered pectin solution is preferably mixed with the calcium slurry by gradually admixing the calcium citrate slurry into the buffered pectin solution. Typically, the admixing of the calcium citrate slurry into the buffered pectin solution takes at least 20 seconds, more preferably at least 40 seconds and most preferably 1-10 minutes.

During the admixture of the calcium citrate slurry, the buffered pectin solution is preferably maintained at a temperature of at least 60° C., more preferred at least 70° C., most preferred at least 75° C.

After admixture of the calcium citrate slurry, the resulting suspension is preferably subjected to shear to improve the pourability of the suspension. Shear may be applied, for instance, by stirring.

The present process preferably produces a concentrated calcium citrate suspension comprising:
- 2.0-9.0 wt. % of high methoxy pectin;
- 2.5-7.0 wt. % tricalcium citrate particles;
- dissolved citrate in a concentration of 1.8-6.5 wt. % citric acid equivalent;
- 0.7-2.1 mol alkali metal cation per mol of dissolved citrate, said alkali metal cation being selected from $Na^+$, $K^+$ and combinations thereof; and
- 78-90 wt. % water.

Another aspect of the present invention relates to a concentrated calcium citrate suspension comprising:
- 2.0-9.0 wt. % of high methoxy pectin;
- 2.5-7.0 wt. % tricalcium citrate particles;
- dissolved citrate in a concentration of 1.8-6.5 wt. % citric acid equivalent;

0.7-2.1 mol alkali metal cation per mol of dissolved citrate, said alkali metal cation being selected from Na$^+$, K$^+$ and combinations thereof; and 78-90 wt. % water.

Preferably, the concentrated calcium citrate suspension has a pH in the range of 3.5-5.0, more preferably in the range of 3.7-4.5, most preferably in the range of 3.8-4.4.

The concentrated calcium citrate suspension is preferably obtainable by the process described herein before.

According to a preferred embodiment, the concentrated calcium citrate suspension comprises 3.0-8.2 wt. % of high methoxy pectin, more preferably 3.5-8.0 wt. % high methoxy pectin.

The concentrated calcium citrate suspension preferably contains 3.0-6.5 wt. % tricalcium citrate particles, more preferably 3.2-6.2 wt. % tricalcium citrate particles.

Typically, concentrated citrate suspension contains not more than 1 wt. % of calcium citrate particles having a diameter in excess of 500 μm, more preferably having a diameter in excess of 400 μm. The particle size of the calcium citrate particles can be determined by means of laser diffraction.

The total amount of dissolved citrate in the concentrated calcium citrate suspension preferably lies in the range of 2.0-5.5 wt. % citric acid equivalent, more preferably in the range of 2.1-4.5 wt. % citric acid equivalent, most preferably in the range of 2.2-3.8 wt. % citric acid equivalent.

Alkali metal cations (Na$^+$ and/or K$^+$) are preferably present in the concentrated calcium citrate suspension in a concentration of 0.8-2.0 mol alkali metal cation per mol of dissolved citrate, more preferably of 0.9-1.8 mol alkali metal cation per mol of dissolved citrate, most preferably in a concentration of 1.0-1.6 mol alkali metal cation per mol of dissolved citrate.

The water content of the concentrated calcium citrate suspension preferably lies in the range of 80-89 wt. %, more preferably of 82-88 wt. %.

The combination of high methoxy pectin, citrate, Ca$^{2+}$, Na$^+$, K$^+$ and water typically constitutes at least 80 wt. %, more preferably at least 90 wt. % of the buffered pectin solution.

Besides high methoxy pectin, citrate, Ca$^{2+}$, Na$^+$, K$^+$ and water, the concentrated calcium citrate suspension may suitably contain further ingredients, such as thickening agents (e.g. starch), vitamins, flavouring and colouring.

Yet another aspect of the invention relates to a use of the concentrated calcium citrate suspension according to the invention to fortify a food product, a nutritional product or a drink with calcium. Preferably the concentrated calcium citrate suspension according to the invention is used to fortify soy protein containing foods and drinks. Examples of soy protein containing foods and drinks in which the calcium citrate suspension may suitably be applied include soy milk and fermented soy milk product, such as fermented soy milk drink and fermented soy milk yogurt.

According to a particularly preferred embodiment of the invention, the concentrated calcium citrate suspension is used to fortify a food product, a nutritional product or a drink containing 1.5-30 wt. %, more preferably 2-12 wt. % and most preferably 2.5-8 wt. % soy protein.

Typically, the concentrated calcium citrate suspension is incorporated in the food product, the nutritional product or the drink in a concentration of 2-30% by weight of the final product, more preferably in a concentration of 5-24% by weight of the final product, and most preferably in a concentration of 8-21% by weight of the final product.

The amount of calcium that is introduced into the fortified product by incorporation of the concentrated calcium citrate suspension typically lies in the range of 400-3,000 ppm, more preferably of 600-2,000 ppm, most preferably of 800-1,500 ppm.

The invention is further illustrated by means of the following non-limiting examples.

EXAMPLES

Example 1

A concentrated calcium citrate suspension according to the present invention was prepared as described below. The composition of the concentrated calcium citrate suspension is shown in Table 1.

TABLE 1

| Ingredient | Wt. % |
|---|---|
| Tricalcium dicitrate tetrahydrate [1] | 5.75 |
| Trisodium citrate (dihydrate) | 2.00 |
| Citric acid (anhydrous) | 1.40 |
| HM pectin [2] | 3.80 |
| Vitamins (B12 and D2) | Trace |
| Water [3] | Remainder |

[1] Tricalcium citrate tetrahydrate from Jungbunzlauer
[2] YM-115-L from CP Kelco
[3] Water hardness was 4°

A buffered pectin solution was prepared in an aseptic cooking vessel by adding an aqueous HM pectin solution (5.4% (w/w)) to water that had been preheated to 90° C. At the same time, aqueous citric acid solution (46.3% (w/w)) and trisodium citrate powder were added. The composition of the buffered pectin solution is shown in Table 2.

TABLE 2

| Ingredient | Wt. % |
|---|---|
| Trisodium citrate (dihydrate) | 2.51 |
| Citric acid (anhydrous) | 1.76 |
| HM pectin | 4.76 |
| Water | Remainder |

Separately, a calcium citrate slurry was prepared by adding the tricalcium citrate to water (preheated to 65° C.). The composition of the calcium citrate slurry is shown in Table 3.

TABLE 3

| Ingredient | Wt. % |
|---|---|
| Tricalcium dicitrate tetrahydrate | 24.73 |
| Water [1] | Remainder |

[1] including water that was used to rinse the preparation vessel and pipes (8% of total amount of water used in the preparation of the slurry)

Next, the calcium citrate slurry was introduced under stirring into the vessel holding the buffer pectin solution, followed by addition of an aqueous vitamin solution (containing vitamins B12 and D2). The buffered pectin solution, the calcium citrate slurry and the aqueous vitamin solution were combined in a weight ratio of approximately 950:275:12

The calcium citrate suspension so obtained was pasteurized in a scraped surface heat exchanger at 90° C., cooled to 37° C. under stirring, and filtered over a 1 mm sieve and filled into containers whilst having a temperature of 35° C.

The containers containing the calcium citrate suspension were stored at 4° C. for 50 days. Throughout this storage period the suspension remained stable and could easily be poured out of the container.

The calcium citrate suspension was used to prepare a calcium fortified yogurt-like product on the basis of soy as described in EP-A 3 042 566. The product so obtained had a calcium content of 1200 ppm.

Example 2

Another concentrated calcium citrate suspension was prepared in the same way as described in Example 1, except that this time the concentrations of trisodium citrate and citric acid were reduced as shown in Table 4.

TABLE 4

| Ingredient | Wt. % |
|---|---|
| Tricalcium dicitrate tetrahydrate [1] | 5.75 |
| Trisodium citrate (dihydrates) | 1.70 |
| Citric acid (anhydrous) | 1.19 |
| HM pectin [2] | 3.80 |
| Vitamins (B12 and D2) | Trace |
| Water [3] | Remainder |

The stability of the calcium suspension so obtained was even better than that of the calcium suspension described in Example 1.

The invention claimed is:

1. An aqueous suspension of concentrated calcium citrate, comprising:
   (a) 2.0-9.0 wt. % of high methoxy pectin;
   (b) 2.5-7.0 wt. % undissolved tricalcium citrate particles;
   (c) dissolved citrate in a concentration of 1.8-6.5 wt. % citric acid equivalent;
   (d) 0.7-2.1 mol alkali metal cation per mol of dissolved citrate, said alkali metal cation being selected from $Na^+$, $K^+$ and combinations thereof; and
   (e) 78-90 wt. % water.

2. The concentrated calcium citrate suspension according to claim 1, having a pH in the range of 3.5-4.5.

3. The concentrated calcium citrate suspension according to claim 1, wherein the high methoxy pectin has a degree of methyl esterification (DM) in the range of 54-90%.

4. The concentrated calcium citrate suspension according to claim 1, wherein the high methoxy pectin has a degree of blockiness (DB) of not more than 40%.

5. The concentrated calcium citrate suspension according to claim 1, wherein the high methoxy pectin is a high methoxy citrus pectin.

6. The concentrated calcium citrate suspension according to claim 1, wherein the suspension comprises:
   (a) 3.0-8.2 wt. % of high methoxy pectin;
   (b) 3.0-6.5 wt. % undissolved tricalcium citrate particles;
   (c) dissolved citrate in a concentration of 2.0-5.5 wt. % citric acid equivalent;
   (d) 0.8-2.0 mol alkali metal cation per mol of dissolved citrate, said alkali metal cation being selected from $Na^+$, $K^+$ and combinations thereof; and
   (e) 80-89 wt. % water.

7. An aqueous suspension of concentrated calcium citrate according to claim 1 obtained by a process, comprising:
   (a) providing a buffered pectin solution comprising:
      (i) 3.0-9.0 wt. % of high methoxy pectin;
      (ii) citrate in a concentration of 2.0-7.0 wt. % citric acid equivalent;
      (iii) 0.7-2.1 mol alkali metal cation per mol of citrate, said alkali metal cation being selected from $Na^+$, $K^+$ and combinations thereof;
      (iv) 80-92 wt. % water;
   (b) providing a calcium citrate slurry comprising 18-32 wt. % of undissolved tricalcium citrate particles and 65-82wt. % water; and
   (c) mixing 100 parts by weight of the buffered pectin solution with 8 to 50 parts by weight of the calcium slurry.

8. A method of fortifying a consumable product with calcium, the method comprising incorporating a concentrated calcium citrate suspension according to claim 1 into the consumable product.

9. The method according to claim 8, wherein the consumable product is a food product, a nutritional product or a drink.

* * * * *